United States Patent [19]

Kajioka et al.

[11] Patent Number: 4,500,168

[45] Date of Patent: Feb. 19, 1985

[54] SINGLE POLARIZATION OPTICAL FIBERS

[75] Inventors: Hiroshi Kajioka, Hitachi; Toshihide Tokunaga, Kitaibaraki; Junkichi Nakagawa, Hitachi, all of Japan

[73] Assignee: Hitachi Cable, Ltd., Tokyo, Japan

[21] Appl. No.: 389,265

[22] Filed: Jun. 17, 1982

[30] Foreign Application Priority Data

Aug. 19, 1981 [JP] Japan .................... 56-129804
Jan. 6, 1982 [JP] Japan ...................... 57-682

[51] Int. Cl.³ .............................................. G02B 5/14
[52] U.S. Cl. ................................. 350/96.34; 350/96.33
[58] Field of Search ............... 350/96.29, 96.30, 96.33, 350/96.34

[56] References Cited

U.S. PATENT DOCUMENTS

| 4,339,173 | 7/1982 | Aggarwal et al. | 350/96.30 |
| 4,385,802 | 5/1983 | Blaszyk et al. | 350/96.33 |
| 4,413,882 | 11/1983 | Bailey et al. | 350/96.30 |
| 4,415,230 | 11/1983 | Keck | 350/96.33 |
| 4,426,129 | 1/1984 | Matsumura et al. | 350/96.33 |

OTHER PUBLICATIONS

Y. Namihira et al., *Electronics Letters*, vol. 18, No. 2, Jan. 21, 1982, "Birefringence in Elliptical-Cladding Single-Polarisation Fibres", pp. 89-91.

T. Katsuyama et al., *Electronics Letters*, vol. 17, No. 13, Jun. 25, 1981, "Low-Loss Single-Polarisation Fibres", pp. 473-474.

*Primary Examiner*—William L. Sikes
*Assistant Examiner*—Frank González
*Attorney, Agent, or Firm*—Curtis, Morris & Safford

[57] ABSTRACT

In the single polarization optical fiber of the present invention, an elliptical jacket is composed of $SiO_2 + P_2O_5 + B_2O_3$, whereby increase in transmission loss at long wavelength band is prevented. In the process for fabricating single polarization optical fibers of the invention, a starting silica tube is subjected to pressure reduction with an amount of pressure reduction in response to concentration of dopants $P_2O_5 + B_2O_3$, whereby an ellipticity of the resulting elliptical jacket is made to be a pertinent value.

4 Claims, 9 Drawing Figures

SINGLE POLARIZATION OPTICAL FIBERS

BACKGROUND OF THE INVENTION

The present invention relates to single-polarization optical fibers, and more specifically to single polarization optical fibers in which increase in light transmission loss at long-wavelength band is suppressed.

DESCRIPTION OF THE PRIOR ART

FIG. 1 is a sectional view showing a conventional single-polarization optical fiber in which light-piping is effected without varying the single mode plane of polarization. This single-polarization optical fiber comprises a core 11 having refractive index $n_1$, an elliptical jacket 12 having refractive index $n_2(n_1 > n_2)$ which surrounds the aforesaid core 11, a support 13 made of silica glass disposed on the outside of the aforesaid elliptical jacket 12, and a plastic jacket 14 being the outermost layer of the optical fiber. Materials of the core 11 and the elliptical jacket 12 are indicated as follows.

| Construction | Materials | |
| --- | --- | --- |
| Core 11 | (a) | $SiO_2$ |
| | (b) | $SiO_2 + B_2O_3$ |
| | (c) | $SiO_2 + GeO_2$ |
| | (d) | $SiO_2 + P_2O_5$ |
| Elliptical Jacket 12 | (a) | $SiO_2 + B_2O_3$ |
| | (b) | $SiO_2 + GeO_2 + B_2O_3$ |

According to such single polarization optical fibers, anisotropic distortion generated due to difference in thermal expansion coefficients between materials of the elliptical jacket 12 and the support 13 is applied to the core 11 so that difference in propagation constants in two directions perpendicular to one another and at right angles to the transmitting direction can be increased, and thus single-mode light-piping can be effected without varying the plane of polarization.

However, in accordance with such conventional single-polarization optical fibers, although light-piping with a transmission loss lower than a predetermined value can be effected in short wavelength band of, for example, wavelength $\lambda = 0.63$ $\mu m$, if wavelength $\lambda =$ around 1.3 $\mu m$, there arises such a case where the transmission loss cannot be suppressed below a predetermined value due to the following reason. This is because the conventional single polarization optical fibers are affected by B—O bond in the $B_2O_3$ dopant in the elliptical jacket 12, and because of an OH group diffusing from a silica glass tube which comes to be the support 13 into the elliptical jacket 12 this diffusion occurs during manufacture at, for example, a high vapor deposition temperature of 1500° C. or more at the time when a material of the elliptical jacket 12 is vapor-deposited on the inner surface of the silica glass tube. This is especially so in the case where the optical fibers are fabricated in accordance with, for instance, Chemical Vapor Deposition (CVD) process.

Furthermore there is also such a case that the elliptical jacket 12 cannot be formed into oval with a prescribed ellipticity, because the elliptical jacket has also a tendency of forming circular shape due to its own surface tension in the event that the conventional single polarization optical fibers are fabricated in accordance with the above-mentioned CVD process.

SUMMARY OF THE INVENTION

Accordingly, an object of the present invention is to provide single-polarization optical fibers in which increase in light transmission loss at long wavelength band is suppressed.

Another object of the present invention is to provide a process for the fabrication of single polarization optical fibers in which an ellipticity of the resulting elliptical jacket is made to be a pertinent prescribed value.

Still another object of the present invention is to provide a process for the fabrication of single polarization optical fibers in which vapor-deposition can be effected at such a temperature where diffusion of OH group from a silica glass tube into an elliptical jacket material decreases in the case when the elliptical jacket material is vapor-deposited on the inner surface of the silica glass tube in accordance with CVD process.

BRIEF DESCRIPTION OF THE INVENTION

The single polarization optical fiber according to the present invention comprises a circular core having a predetermined first refractive index; an elliptical jacket having a predetermined second refractive index which is smaller than that of the aforesaid first refractive index and contains $B_2O_3$ for decreasing refractive index and $P_2O_5$ for lowering softening temperature and viscosity on the basis of a total concentration of dopants of the aforesaid $B_2O_3$ and $P_2O_5$; and a support made of silica glass.

The process for the fabrication of single polarization optical fibers according to the present invention comprises the steps of vapor-depositing $SiO_2 + P_2O_5 + B_2O_3$ which comes to be an elliptical jacket on the inner surface of a silica glass tube at such a predetermined temperature where diffusion of OH group from the silica glass tube into the elliptical jacket decreases; vapor-depositing a core material on the inner surface of the resulting elliptical jacket; collapsing the silica glass tube onto which vapor deposition of the aforesaid materials has been thus completed with a predetermined amount of pressure reduction; and heat-wire drawing the resulting collapsed silica glass tube on the basis of difference in viscosities between the aforesaid silica tube of support material and the elliptical jacket material at the time of softening and melting them, thereby to control an ellipticity of the aforesaid elliptical jacket.

DETAILED DESCRIPTION OF THE INVENTION

The construction of the present invention will specifically be described hereinbelow by referring to the accompanying drawings showing embodiments of the invention.

Figure 1:
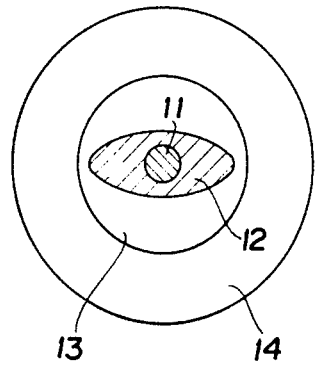
FIG. 1 is a sectional view showing a conventional single polarization type optical fiber.
Figure 2:
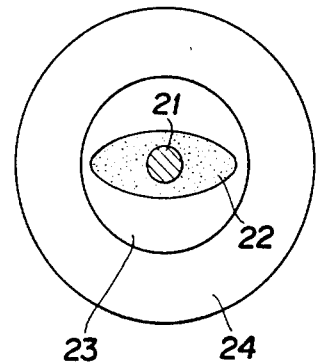
FIG. 2 is a sectional view showing a first embodiment of the single polarization type optical fiber according to the present invention.

FIG. 2 shows a first embodiment of the single polarization optical fiber according to the present invention in which reference numeral 21 designates a circular core preferably made of $SiO_2$ glass or $SiO_2 + GeO_2$ glass, 22 an elliptical jacket made of $SiO_2 + P_2O_5 + B_2O_3$ glass, 23 a support fabricated from a starting material of silica tube, and 24 a plastic jacket, respectively. The elliptical jacket 22 may directly be disposed on the outside of the core 21, but it may also be disposed on the outside through at least one other layer. The elliptical jacket 22 contains 5-20 mol % of $P_2O_5 + B_2O_3$ and a mol % ratio of $B_2O_3$ to $P_2O_5$ is within a range of 1:1-1.2.

In the single polarization type optical fiber as constructed above, a temperature at the time when a glass film which will form the elliptical jacket is formed on the inside of the silica tube being a starting material can be reduced to, for example, around 1,400°-1,500° C. in case of fabricating such optical fiber so that diffusion of OH group from the silica tube to a material of the elliptical jacket can also be reduced.

Namely, each glass softening temperature dependent on dopants in the case where differences in refractive index are intended to establish on the basis of the refractive index of $SiO_2$ glass is as indicated in Table 1 in which the numerical values in parentheses indicate mol % of dopants added.

TABLE 1

| Glass | Refractive Index Difference Δ n | | |
|---|---|---|---|
| | 0.05% | 0.1% | 0.5% |
| $SiO_2 + P_2O_5$ | 1405° C. (1) | 1230° C. (2) | — |
| $SiO_2 + GeO_2$ | — | 1576° C. (1.2) | 1558° C. (6) |
| $SiO_2 + B_2O_3$ | 1560° C. (1) | 1540° C. (2) | 1380° C. (10) |
| $SiO_2 + P_2O_5 + B_2O_3$ | 1350° C. (10) | — | — |

In connection with Table 1, it is to be noted that $P_2O_5$ or $GeO_2$ functions to increase a refractive index of the resultant glass, whilst $B_2O_3$ functions to decrease a refractive index of such resulting glass. Based on such fact, it is intended in the present invention that a refractive index of the elliptical jacket 22 is made smaller than that of the core 21 by adjusting an amount of $B_2O_3$ and on the other hand, a softening temperature of a material of the elliptical jacket 22 is lowered by adjusting an amount of $P_2O_5$ to be added.

In view of the above, a temperature increase of about 200° C. higher than such softening temperature is sufficient to promote chemical reaction at the time when optical fibers are fabricated in the CVD process so that the diffusion of OH group from the silica tube can be prevented in accordance with the construction as shown in FIG. 2.

Figure 3:
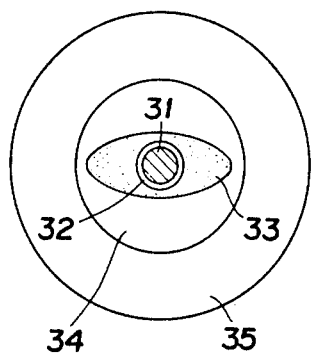
FIG. 3 is a sectional view showing a second embodiment of the single polarization type optical fiber according to the present invention.

FIG. 3 illustrates a second embodiment of the single polarization optical fiber according to the present invention in which reference numeral 31 designates a circular core preferably made of $SiO_2 + GeO_2$ glass or the like, 32 a cladding having a circular section and made of high purity $SiO_2$ glass, 33 an elliptical jacket substantially composed of $SiO_2 + P_2O_5 + B_2O_3$ glass, 34 a support containing $SiO_2$ as the principal component, and 35 a plastic jacket, respectively.

In the single polarization optical fiber of the second embodiment, it is arranged in such that a thickness of the circular cladding 32 is ½ time larger than a radius of the core 31 and is smaller than a diameter of the core 31, whilst a refractive index of the elliptical jacket 33 is higher than that of the circular cladding 32 and lower than that of the core 31.

In case of a single-mode optical fiber, electromagnetic field component leaks into the cladding due to the fluctuation of normalized frequency unlike the case of a multiple-mode optical fiber so that a condition of the cladding 32 is important. In this respect, if the cladding 32 consisting of high impurity $SiO_2$ is thick, influence of $B_2O_3$ in the elliptical jacket 33 comes to be small. According to experiments, when a thickness of the circular cladding 32 is larger than a radius of the core 31 as in the aforesaid case, increase in the loss at wavelength of 1.3 μm band became negligible.

Furthermore, for the sake of preventing diffusion of B—O bond from the elliptical jacket 33, it is more favorable that the cladding 32 is thick, but when the cladding 32 is thicker than a diameter of the core 31, it becomes difficult to increase an ellipticity of the elliptical jacket 33 so that favorable single polarization characteristics cannot be attained.

Meanwhile, in a single-mode optical fiber, even if a thickness of the circular cladding 32 is preset as mentioned above, cut-off wavelength varies dependent on a slight change in core diameter and refractive index, whereby a normalized frequency at the active wavelength varies so that there is a case where the electromagnetic field component leaks occasionally to the elliptical jacket 33. If such electromagnetic field component is transmitting mode, a part of the wave energy is absorbed by means of the elliptical jacket and it results in increase in transmission loss.

For the sake of preventing such increase in transmission loss, undesirable mode is subjected to leakage and at the same time, a refractive index of the elliptical jacket 33 is made larger than that of the cladding 32 so as to be capable of transmitting only a predetermined mode such that the electromagnetic field component concentrates in the central portion of the core 31.

Results of the measurement on optical fibers of trial fabrication were as follows. That is, a value for attenuation was 0.7 dB/Km at $\lambda = 1.2$ μm, and it was 0.8 dB/Km at even $\lambda = 1.3$ μm.

An ellipticity ε of the optical fiber of the trial fabrication was $\epsilon = 60\%$, and a coupling length thereof was about 4 mm ($\lambda = 1.3$ μm).

Furthermore a definition of ε is given in accordance with an equation $$\epsilon = \frac{\text{major axis} - \text{minor axis}}{\text{major axis} + \text{minor axis}} \times 100\ (\%).$$

and it is preferable that $\epsilon$ is within a range of 40-60%.

As described above, increase in transmission loss at long wavelength band of a wavelength $\lambda$=about 1.3 $\mu$m can be prevented in accordance with the single polarization type optical fiber of the present invention.

An embodiment of the process for the fabrication of single polarization optical fibers according to the present invention will be described hereinbelow by referring to FIGS. 4 and 5, respectively.

A $SiO_2 + P_2O_5 + B_2O_3$ system glass film 43 is deposited on the inner wall surface of a transparent silica glass tube 44 possessing an outer diameter of 18 mm and a thickness of 1.5 mm. In this case, it is required for the reasons as set forth hereinbelow that a total amount of $P_2O_5$ and $B_2O_3$ in the glass film is 5-20 mol % (mol % ratio of $B_2O_3$ to $P_2O_5$ is 1:1-1.2 as stated above) and the balance is $SiO_2$, but the glass film 43 containing 12 mol % of $P_2O_5 + B_2O_3$ was formed in this specific embodiment.

Then, a high purity $SiO_2$ film is further deposited on the surface of the resulting glass film 43 with a thickness of about 10 $\mu$m, and a $SiO_2 + GeO_2$ film which comes to be core is deposited on the aforesaid high purity $SiO_2$ film with a thickness of about 5 $\mu$m.

Figure 4:
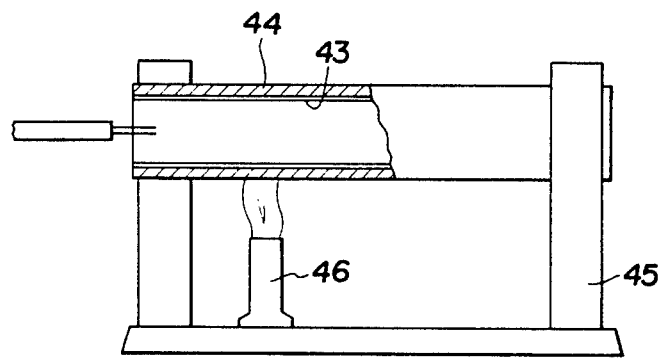
FIG. 4 is an explanatory view illustrating a method for vapor-depositing the inner surface of a silica glass tube in the process for the fabrication of single polarization optical fibers according to the present invention.
Figure 5:
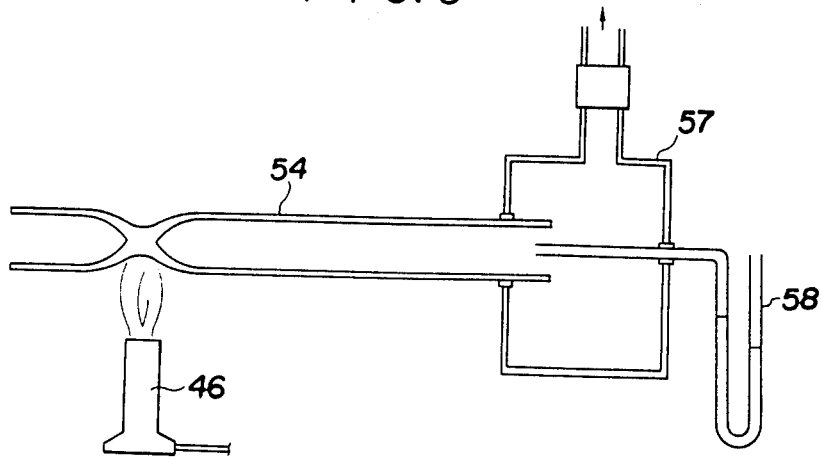
FIG. 5 is an explanatory view illustrating a method for collapsing a silica glass tube onto which vapor deposition of materials has been completed by means of pressure reduction in the process for the fabrication of single polarization optical fibers according to the present invention.

In FIGS. 4 and 5, reference numerals 45 designates a lathe, and 46 a burner, respectively.

Thereafter, one end of a glass tube 54 is sealed, a pressure in the glass tube is reduced to 5 mmH$_2$O by means of a decompression device 57 through the other end of the glass tube 54, such glass tube is heated by means of the oxy-hydrogen burner 46 at a temperature of about 1,900° C. (Inside the glass tube 54, a reaction temperature of 1,400°-1,500° C. is attained.), a rate of travel of the burner 46 is adjusted to 5 mm/min., whereby the glass tube 54 is collapsed to shape no void inside (Reference numeral 54 designates the glass tube 44 on which prescribed films have been disposed in the preceding step, respectively).

The solid preform thus obtained is subjected to heat wire drawing to obtain a single polarization type optical fiber. Reference numeral 58 designates a pressure gauge.

Figure 6:
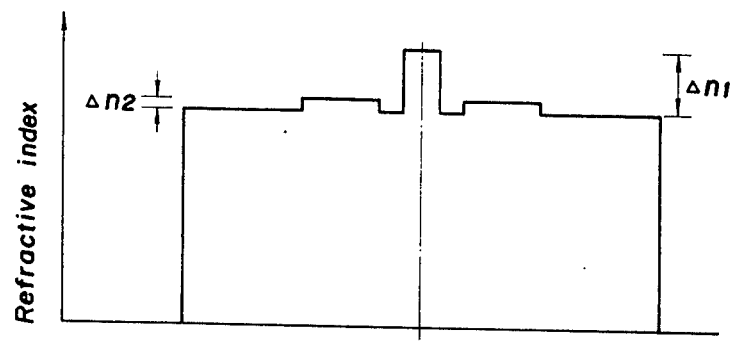
FIG. 6 is a graphical representation showing refractive index in the diametrical direction of the single polarization optical fiber according to the present invention.
Figure 7:
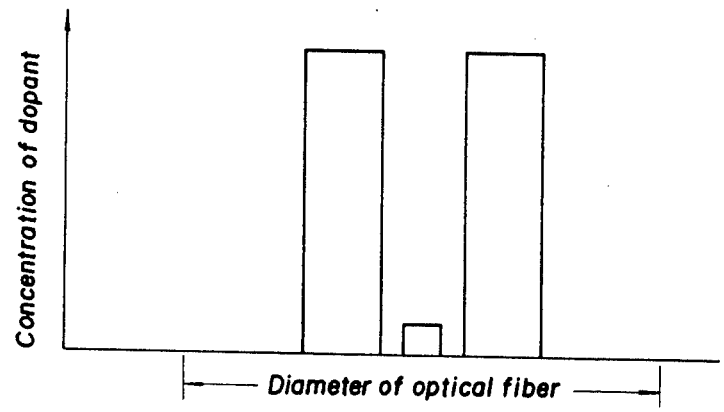
FIGS. 7 and 8 are graphical representation each showing an example of concentration of dopants in the diametrical direction of the single polarization optical fiber according to the present invention.

FIG. 6 is a graphical representation illustrating distribution of refractive index in a section of the resulting optical fiber, and FIG. 7 is also a graphical representation illustrating distribution of dopant (components for controlling refractive index other than $SiO_2$) concentration.

In accordance with the process for the fabrication of optical fibers of the invention, single-mode polarization type optical fibers each having a cut-off wavelength of 1.2 $\mu$m in the case where a difference in refractive indices $\Delta n_1 = 0.35\%$ between the core and circular cladding, a difference in refractive indices $\Delta n_2 = 0.05\%$ between the elliptical jacket and circular cladding, a core diameter is 8 $\mu$m, and a thickness in the circular cladding is 4 $\mu$m, respectively, were obtained.

Figure 8:
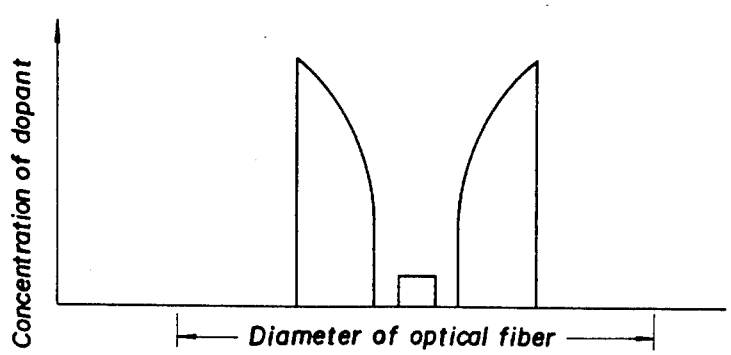

In this embodiment, a concentration of dopants contained in the elliptical jacket is diametrically constant, but it may be changed diametrically as illustrated in FIG. 8.

In the case where such concentration is diametrically changed, it becomes important what value is selected at the maximum part of concentration. At all events, important is such that an amount of dopants in the elliptical jacket is adjusted to 5-20 mol %. Namely, a viscosity of materials must be decreased to reduce its surface tension in order that only the elliptical jacket is formed into oval with a prescribed ellipticity while keeping the inside core and cladding circular. For this reason 5-6 mol % is minimum amount of dopants to provide a critical maximum viscosity, and if a doped amount is less than 5-6 mol %, the viscosity increases so that it is difficult to form the elliptical jacket into oval.

Furthermore 18-20 mol % is maximum amount of dopants to provide a critical minimum viscosity at which a $SiO_2$ glass layer having higher melting point can be deposited on the elliptical jacket deposition. In other words, if $SiO_2 + P_2O_5 + B_2O_3$ glass contains more than 20 mol % of $P_2O_5 + B_2O_3$, its melting point and viscosity becomes remarkably low. As a result, such glass is closely allied to liquid at the reaction temperature for forming a high purity $SiO_2$ film thereon so that the film for the elliptical jacket is deformed along the transfer of the burner and thus, the fabrication of optical fibers comes to be difficult.

Figure 9:
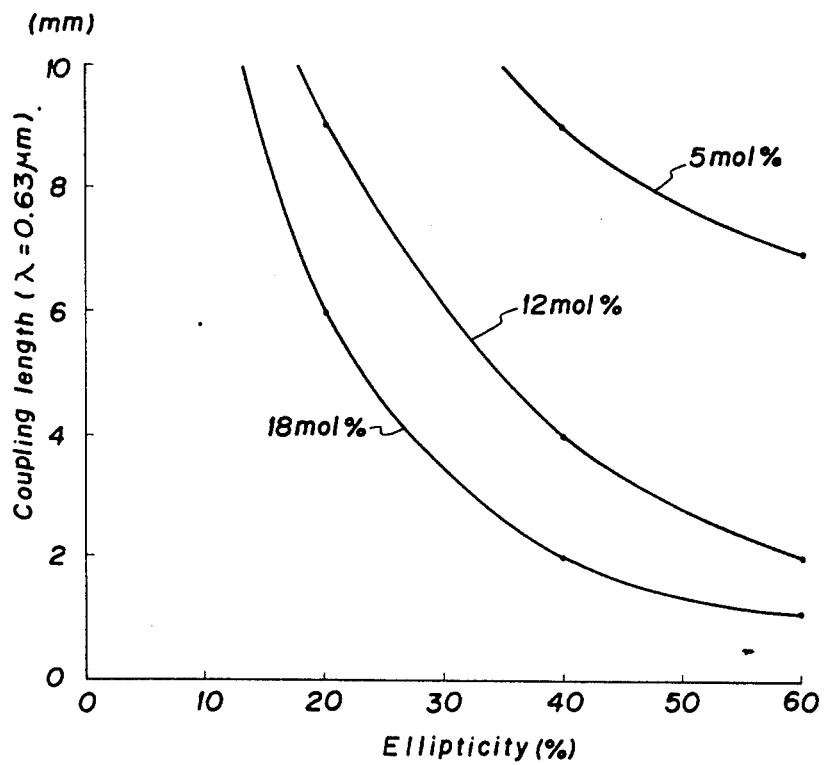
FIG. 9 is a graphical representation showing a relationship between an ellipticity and a coupling length of the single polarization optical fiber according to the present invention.

FIG. 9 is a graphical representation illustrating a relationship between an ellipticity and a coupling length in respect of a doped amount of the elliptical jacket.

Such ellipticity can be controlled by means of an amount of pressure reduction at the time when the tube is collapsed, if a concentration of dopants is determined.

Ellipticity 40% can be accomplished by adjusting either a dopant concentration to 5 mol % at an amount of pressure reduction of 12 mmH$_2$O, or the dopant concentration to 20 mol % at an amount of pressure reduction of 0.5 mmH$_2$O, respectively.

According to the experiments of the inventors, a suitable relationship between a concentration of dopants and an amount of pressure reduction is indicated in Table 2, but optical fibers are easier to be fabricated at a dopant concentration range of around 8-15 mol %.

TABLE 2

| Concentration of Dopant | Suitable Amount of Pressure Reduction |
|---|---|
| 5-8 mol % | 5.0-15.0 mmH$_2$O |
| 8-11 mol % | 2.0-9.0 mmH$_2$O |
| 11-20 mol % | 0.5-6.0 mmH$_2$O |

It is to be understood that the ranges shown in Table 2 are those which were obtained by the experiments and within which optical fibers are well controlled for the fabrication thereof. In the meantime, it does not mean that the optical fibers of the present invention cannot be fabricated in the ranges other than those described above.

It has been confirmed by the inventors that there is a critical value in amount of pressure reduction, and that it is difficult to keep a core completely circular, for instance, if the amount of pressure reduction exceeds 15 mmH$_2$O, and sometimes to make even the core oval at the time of forming the elliptical jacket. Concerning these values, there is a room for modification with a certain extent if a starting silica tube is worked, or the dimension or shape thereof is changed, but these values are not remarkably changed fundamentally.

As another condition for the fabrication of the optical fibers according to the present invention than those stated above, a rate of travel of burner will be presented herein.

Namely, it is required to adjust a rate of travel of such burner to around 2.5–12 mm/min. If such rate deviates considerably from the aforesaid range, it becomes difficult to attain such prescribed object in the present invention that the elliptical jacket is formed into oval while keeping the core and the outer shape of an optical fiber circular.

Although the present invention has been described with reference to preferred embodiments thereof, many modification and alteration may be made within the spirit and scope of the present invention.

We claim:

1. In a single polarization optical fiber of the type comprising a circular core having a predetermined first refractive index; an elliptical jacket positioned on the outside of said circular core, having a predetermined second refractive index which is smaller than that of said first refractive index; and a supporting layer made of silica glass and positioned on the outside of said elliptical jacket; the improvement wherein said elliptical jacket contains dopants of $B_2O_3$ and $P_2O_5$, the content of said dopants being 5–20 mol % relative to the total material forming said elliptical jacket, said $B_2O_3$ being provided for decreasing the second refractive index and said $P_2O_5$ being provided for lowering softening temperature and viscosity thereof.

2. A single polarization optical fiber as claimed in claim 1 wherein the mol % ratio of $B_2O_3$ to $P_2O_5$ in said elliptical jacket is within a range of 1:1 to 1:1.2.

3. A single polarization optical fiber comprising a circular core having a predetermined first refractive index; a circular cladding positioned on the outside of said circular core and having a predetermined second refractive index which is smaller than that of said first refractive index; and elliptical jacket positioned on the outside of said circular cladding, having a refractive index which is smaller than said first refractive index and larger than said second refractive index, and containing dopants of $B_2O_3$ and $P_2O_5$, the contents of the said dopants being 5–20 mol % to the total elliptical jacket, wherein the mol % ratio of $B_2O_3$ to $P_2O_5$ is within the range of 1:1 to 1:1.2, said $B_2O_3$ being provided for decreasing the refractive index and said $P_2O_5$ being provided for lowering softening temperature and viscosity; and a supporting layer made of silica glass and positioned on the outside of said elliptical jacket.

4. A single polarization optical fiber as claimed in claim 3 wherein said circular cladding has a thickness which is larger than half the radius of said core and smaller than a diameter thereof.

* * * * *